(12) United States Patent
Jung

(10) Patent No.: US 9,071,057 B2
(45) Date of Patent: Jun. 30, 2015

(54) CONTACTLESS POWER TRANSMITTING SYSTEM HAVING OVERHEAT PROTECTION FUNCTION AND METHOD THEREOF

(71) Applicant: Hanrim Postech Co. Ltd., Suwon-si, Gyeonggi-do (KR)

(72) Inventor: Chun-Kil Jung, Seoul (KR)

(73) Assignee: HANRIM POSTECH CO., LTD., Suwon-si (KR)

( * ) Notice: Subject to any disclaimer, the term of this patent is extended or adjusted under 35 U.S.C. 154(b) by 0 days.

(21) Appl. No.: 14/046,210

(22) Filed: Oct. 4, 2013

(65) Prior Publication Data

US 2014/0035535 A1 Feb. 6, 2014

Related U.S. Application Data

(63) Continuation of application No. 13/667,615, filed on Nov. 2, 2012.

(30) Foreign Application Priority Data

Nov. 2, 2011 (KR) .......................... 10-2011-0113239

(51) Int. Cl.
*H02J 7/00* (2006.01)
*H02J 7/04* (2006.01)
(Continued)

(52) U.S. Cl.
CPC ............... *H02J 7/0029* (2013.01); *H02J 5/005* (2013.01); *H02J 7/025* (2013.01); *H02J 7/0091* (2013.01); *H02J 2007/0001* (2013.01)

(58) Field of Classification Search
CPC ................................. H02J 7/0029; H02J 7/025

USPC .................... 320/108, 150; 307/104; 455/572
See application file for complete search history.

(56) References Cited

U.S. PATENT DOCUMENTS 5,241,259 A * 8/1993 Patino et al. .................. 320/150
5,963,012 A 10/1999 Garcia et al. .................. 320/106
(Continued)

FOREIGN PATENT DOCUMENTS

GB          2 416 633 A    1/2006
WO    WO 2009/105595 A2   8/2009
(Continued)

OTHER PUBLICATIONS

European Search Report mailed Mar. 15, 2013, issued in corresponding European Application No. 12190889.1-1804.

*Primary Examiner* — M'Baye Diao
(74) *Attorney, Agent, or Firm* — Stein IP, LLC

(57) ABSTRACT

Disclosed herein are a contactless power transmitting system having an overheat protection function, which protects a battery cell module from damage due to overheating while the battery cell module is being charged, and a method thereof. In the contactless power transmitting system, a contactless power transmitting apparatus transmits a first power to a contactless power receiving apparatus through a power transmitting coil to charge the battery cell module with the first power, and transmits a second power, of lower wattage than the first power, to the contactless power receiving apparatus through the power transmitting coil to charge the battery cell module with the second power if an overheat alarm signal is received from the contactless power receiving apparatus, thereby making it possible to fully charge the battery cell module while preventing overheating of the battery cell module.

9 Claims, 3 Drawing Sheets

(51) Int. Cl.
  *H01F 27/42* (2006.01)
  *H04M 1/38* (2006.01)
  *H02J 5/00* (2006.01)
  *H02J 7/02* (2006.01)

(56) References Cited

U.S. PATENT DOCUMENTS

| | | | |
|---|---|---|---|
| 7,884,927 B2 * | 2/2011 | Onishi et al. | 356/73.1 |
| 8,188,709 B2 * | 5/2012 | Onishi et al. | 320/108 |
| 8,188,854 B2 * | 5/2012 | Yamashita | 340/538 |
| 8,290,463 B2 * | 10/2012 | Liu et al. | 455/293 |
| 2006/0241356 A1 * | 10/2006 | Flaherty | 600/301 |
| 2008/0053979 A1 * | 3/2008 | Toya et al. | 219/201 |
| 2009/0127937 A1 * | 5/2009 | Widmer et al. | 307/149 |
| 2009/0174364 A1 * | 7/2009 | Onishi et al. | 320/108 |
| 2010/0207771 A1 | 8/2010 | Trigiani | 340/636.1 |
| 2010/0328044 A1 * | 12/2010 | Waffenschmidt et al. | 340/10.4 |
| 2011/0169446 A1 | 7/2011 | Kondo | 320/108 |
| 2012/0068550 A1 * | 3/2012 | Boer et al. | 307/104 |

FOREIGN PATENT DOCUMENTS

| | | |
|---|---|---|
| WO | WO 2010/020895 A2 | 2/2010 |
| WO | WO 2012/141800 A1 | 10/2012 |

* cited by examiner

CONTACTLESS POWER TRANSMITTING SYSTEM HAVING OVERHEAT PROTECTION FUNCTION AND METHOD THEREOF

CROSS-REFERENCE TO RELATED APPLICATIONS

This application is a continuation of U.S. application Ser. No. 13/667,615, filed Nov. 2, 2012, which claims the benefit of Korean Application No. 10-2011-0113239, filed Nov. 2, 2011 in the Korean Intellectual Property Office and entitled "Contactless Power Transmitting System Having Overheat Protection Function And Method Thereof", the disclosure of which is incorporated herein by reference in its entirety.

BACKGROUND OF THE INVENTION

1. Field of the Invention

The present invention relates to a contactless power transmitting system having an overheat protection function, which protects a battery cell module from damage due to overheating while the battery cell module is being charged, and a method thereof.

2. Description of the Related Art

Generally, a portable terminal such as a cellular phone, a personal digital assistant (PDA), or the like, includes a battery pack. The battery pack may be charged with a power supplied from an external charging apparatus, and may supply the charged power to the portable terminal for operation according to a manipulation of a user.

The battery pack may include a battery cell module charged with the power, and a circuit for charging and discharging the power in the battery cell module, among other components.

One method of electrically connecting the battery pack and the charging apparatus to each other is a direct contact between a terminal of the charging apparatus and a terminal of the battery pack.

However, when the two terminals contact each other or are separated from each other, because the terminal of the battery pack and the terminal of the charging apparatus have different potential differences, an instantaneous discharge phenomenon can occur. This instantaneous discharge phenomenon causes abrasion of the terminals, and creates a risk of an accident such as a fire or the like if foreign materials have accumulated in either terminal.

In addition, the electrical energy charged in the battery pack naturally discharges into the environment through the terminal of the battery pack due to moisture or the like, such that a lifespan of the battery pack may decrease and performance thereof may deteriorate.

Recently, contactless power transmitting systems, using methods of transmitting a power without a direct contact between terminals, have been suggested in order to solve several problems of the terminal connection method as described above.

In these contactless power transmitting systems, efforts to improve transmission efficiency of the power, as well as to stably transmit and receive the power, have been made.

SUMMARY OF THE INVENTION

While not limited thereto, according to an embodiment of the present invention, when a contactless power receiving apparatus receives a first power transmitted by a contactless power transmitting apparatus and a charging apparatus charges a battery cell module with the first power, the contactless power receiving apparatus may judge whether or not the battery cell module has been overheated.

According to an aspect of the invention, the judging of whether or not the battery cell module has been overheated may be performed by detecting a first temperature of the battery cell module using a first temperature sensor, and judging that the battery cell module has been overheated if the detected first temperature is equal to or higher than a preset temperature.

According to an aspect of the invention, the judging of whether or not the battery cell module has been overheated may be performed by detecting a first temperature of the battery cell module using a first temperature sensor, detecting a second temperature of the environment using a second temperature sensor, and judging that the battery cell module has been overheated if a difference between the first temperature and the second temperature is equal to or higher than a preset difference in temperature.

According to an aspect of the invention, if it is judged that the battery cell module has been overheated, the contactless power receiving apparatus may generate an overheat alarm signal to transmit to the contactless power transmitting apparatus.

According to an aspect of the invention, the contactless power transmitting apparatus may transmit a second power, of lower wattage than the first power, to the contactless power receiving apparatus, if the overheat alarm signal is received, to charge the battery cell module with the second power, thereby preventing the battery cell module from overheating.

According to an aspect of the invention, after the contactless power receiving apparatus generates the overheat alarm signal, the charging unit may switch to a second power charging mode in which the battery cell module is charged with the second power, thereby preventing generation of an error.

While not limited thereto, according to an embodiment of the present invention, a contactless power transmitting apparatus having an overheat protection function may comprise a power transmitting unit, comprising a power transmitting coil which transmits a power to a contactless power receiving apparatus; a first signal receiving unit which receives an overheat alarm signal transmitted by the contactless power receiving apparatus; and a contactless power transmission controlling unit which directs the power transmitting unit to transmit a first power to the contactless power receiving apparatus, and which directs the power transmitting unit to transmit a second power, of lower wattage than the first power, to the contactless power receiving apparatus if the first signal receiving unit receives the overheat alarm signal.

According to an aspect of the invention, the power transmitting unit may further comprise a driving driver which generates a driving signal for transmitting the first power or the second power under a direction of the contactless power transmission controlling unit; and a series resonant converter which switches a direct current (DC) power according to the driving signal, wherein the power transmitting coil transmits the first power or the second power to the contactless power receiving apparatus while being resonated with the power switched by the series resonant converter.

According to an aspect of the invention, the contactless power transmitting apparatus may further comprise a first signal transmitting unit which generates an identification (ID) request signal and transmits the generated ID request signal to the contactless power receiving apparatus, under a direction of the contactless power transmission controlling unit, wherein the first signal receiving unit receives an ID signal transmitted by the contactless power receiving apparatus according to the ID request signal and provides the received ID signal to the contactless power transmission controlling unit.

While not limited thereto, according to an embodiment of the present invention, a contactless power receiving apparatus having an overheat protection function may a charging apparatus which receives a first power transmitted by a contactless power transmitting apparatus, and which charges a battery cell module with the first power; a second signal transmitting unit which generates an overheat alarm signal, and which transmits the overheat alarm signal to the contactless power transmitting apparatus; and a contactless power reception controlling unit which judges whether or not the battery cell module has been overheated, and which, if it is judged that the battery cell module has been overheated, directs the second signal transmitting unit to generate the overheat alarm signal and transmit the generated overheat alarm signal to the contactless power transmitting apparatus and then directs the charging apparatus to receive a second power, of lower wattage than the first power, from the contactless power transmitting apparatus and to charge the battery cell module with the second power.

According to an aspect of the invention, the contactless power receiving apparatus may further comprise a first temperature sensor which detects a first temperature of the battery cell module, wherein the contactless power reception controlling unit judges whether or not the battery cell module has been overheated using the first temperature.

According to an aspect of the invention, the contactless power receiving apparatus may further comprise a first temperature sensor which detects a first temperature of the battery cell module; and a second temperature sensor which detects a second temperature of the environment, wherein the contactless power reception controlling unit judges whether or not the battery cell module has been overheated using a difference between the first and second temperatures.

According to an aspect of the invention, the contactless power receiving apparatus may further comprise a second signal receiving unit which receives an ID request signal transmitted by the contactless power transmitting apparatus, and which provides the ID request signal to the contactless power reception controlling unit, wherein, if the ID request signal is received, the second signal transmitting unit generates an ID signal and transmits the generated ID request signal to the contactless power transmitting apparatus under a direction of the contactless power reception controlling unit.

According to an aspect of the invention, the charging apparatus may comprise a power receiving coil which receives the first power or the second power transmitted by the contactless power transmitting apparatus; a rectifying unit which rectifies the first power or the second power received by the power receiving coil into a DC power; and a charging unit which charges the battery cell module with the DC power rectified by the rectifying unit, under a direction of the contactless power reception controlling unit.

While not limited thereto, according to an embodiment of the present invention, a contactless power receiving method having an overheat protection function may comprise transmitting, using a contactless power transmitting apparatus, a first power to a contactless power receiving apparatus through a power transmitting coil; and transmitting, using the contactless power transmitting apparatus, a second power, of lower wattage than the first power, to the contactless power receiving apparatus through the power transmitting coil if an overheat alarm signal is received from the contactless power receiving apparatus.

According to an aspect of the invention, the transmitting of the first power may comprise transmitting, using the contactless power transmitting apparatus, an ID request signal to the contactless power receiving apparatus; and transmitting the first power if an ID signal is received from the contactless power receiving apparatus according to the ID request signal.

According to an aspect of the invention, the transmitting of the ID request signal may comprise judging whether or not a change in a load has been generated in the power transmitting coil; and transmitting the ID request signal if it is judged that the change in the load has been generated in the power transmitting coil.

According to an aspect of the invention, the contactless power transmitting method may further comprise stopping the transmission of the first or second power if a charge completion signal is received from the contactless power receiving apparatus.

While not limited thereto, according to an embodiment of the present invention, a contactless power transmitting method having an overheat protection function may comprise receiving, in a charging apparatus, a first power transmitted by a contactless power transmitting apparatus to charge a battery cell module with the first power; judging, using a contactless power reception controlling unit, whether or not the battery cell module has been overheated; if it is judged that the battery cell module has been overheated, transmitting an overheat alarm signal to the contactless power transmitting apparatus; and if the overheat alarm signal is transmitted, receiving, in the charging apparatus, a second power, of lower wattage than the first power, to charge the battery cell module with the second power.

According to an aspect of the invention, the judging of whether or not the battery cell module has been overheated may comprise detecting, in a first temperature sensor, a first temperature of the battery cell module; and judging that the battery cell module has been overheated if the first temperature is equal to or higher than a preset temperature.

According to an aspect of the invention, the judging of whether or not the battery cell module has been overheated may comprise detecting, in a first temperature sensor, a first temperature of the battery cell module; detecting, in a second temperature sensor, a second temperature of the environment; and judging that the battery cell module has been overheated if a difference between the first and second temperatures is equal to or higher than a preset value.

According to an aspect of the invention, the contactless power receiving method may further comprise judging, in the contactless power reception controlling unit, whether or not the charging of the battery cell module has been completed; and, if it is judged that the charging of the battery cell module has been completed, transmitting a charge completion signal to the contactless power transmitting apparatus.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
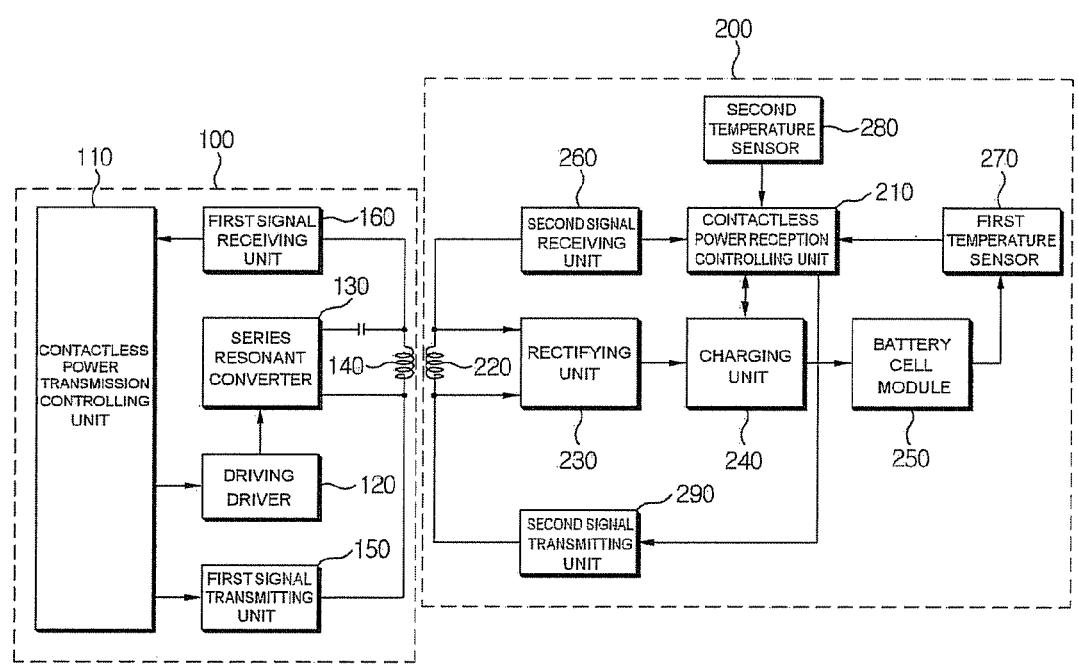
FIG. 1 is a diagram of a configuration of a contactless power transmitting system according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures, and to present a principle and a concept of the present invention in a manner that most usefully and easily described the present invention.

The following detailed description is only an example and only illustrates exemplary embodiments of the present invention. For basic understanding of the present invention, unnecessary details and additional embodiments of the present invention that may be executed by those skilled in the art will not be described.

According to an aspect of the invention depicted in FIG. 1, a contactless power transmitting system may comprise a contactless power transmitting apparatus 100 and a contactless power receiving apparatus 200.

The contactless power transmitting apparatus 100 transmits a power using a method of electromagnetic induction, and the contactless power receiving apparatus 200 receives the power using the method of electromagnetic induction. More specifically, the contactless power transmitting apparatus 100 transmits a first power, or a second power of lower wattage than the first power, without a direct contact. The contactless power receiving apparatus 200 receives the transmitted first power or second power, for use to charge a battery cell module 250 or to supply an operation power to a load such as a portable terminal or the like; said load may be the contactless power receiving apparatus 200 itself.

The contactless power transmitting apparatus 100 is operated by a direct current (DC) power supplied by an alternate current (AC) to DC converter (not shown). The AC to DC converter may be provided separately from or integrally with the contactless power transmitting apparatus 100.

The contactless power transmitting apparatus 100 may comprise a contactless power transmission controlling unit 110, a power transmitting unit, a first signal transmitting unit 150, and a first signal receiving unit 160.

The contactless power transmission controlling unit 110 recognizes the contactless power receiving apparatus 200 and directs a transmission of the first power or the second power.

The power transmitting unit, which transmits the first power or the second power to the contactless power receiving apparatus 200 under the direction of the contactless power transmission controlling unit 110, may include a driving driver 120, a series resonant converter 130, and a power transmitting coil 140.

The driving driver 120 generates one or more driving signals under the control of the contactless power transmission controlling unit 110. Said driving signals may include but are not limited to a signal to detect a change in a load, a signal to transmit the first power, a signal to transmit the second power, and so forth.

The series resonant converter 130 switches a DC power, supplied from the AC to DC converter or the like, according to the driving signals generated by the driving driver 120. The serial resonant converter 130 may comprise switching devices such as a plurality of transistors, and more specifically a plurality of metal oxide semiconductor field effect transistors (MOSFETs); however, numerous other compositions and arrangements may be appreciated by those of skill in the art.

The power transmitting coil 140 of the power transmitting unit generates a signal to detect a change in the load while being resonated in series with the power switched by the series resonant converter 130, and transmits the first power or the second power.

Although the depiction in FIG. 1 shows only one power transmitting coil 140, a plurality of power transmitting coils may be connected and used in parallel with each other in practicing the present invention. In the case of using the plurality of power transmitting coils, a switch and a capacitor may be provided in series with each of the plurality of power transmitting coils, and the switch may be selectively switched under the control of the contactless power transmission controlling unit 110 to allow the power switched in the series resonant converter 130 to be selectively outputted to the plurality of power transmitting coils. Specific systems and methods of connecting a plurality of power transmitting coils are well known in the art, and those skilled in the art will recognize ways to incorporate said systems and methods into aspects of the present invention.

The first signal transmitting unit 150 generates an identification (ID) request signal or the like under the direction of the contactless power transmission controlling unit 110, and provides said signal to the power transmitting coil 140 to be transmitted to the contactless power receiving apparatus 200.

The first signal receiving unit 160 receives one or more signals, and may provide said signals to the contactless power transmission controlling unit 110. Said signals may include but are not limited to a signal indicating a change in a load of the power transmitting coil 140, an ID signal transmitted by the contactless power receiving apparatus 200, an overheat alarm signal, a charging completion signal, and so forth.

The contactless power receiving apparatus 200 may comprise a contactless power reception controlling unit 210, a charging apparatus, a battery cell module 250, a second signal receiving unit 260, a first temperature sensor 270, a second temperature sensor 280, a second signal transmitting unit 290, and the like.

The contactless power reception controlling unit 210 directs a transmission of an ID signal to the contactless power transmitting apparatus 100, according to the ID request signal transmitted by the contactless power transmitting apparatus 100; directs a reception of the first power or the second power transmitted by the contactless power transmitting apparatus 100 to charge the battery cell module 250; and directs a generation of an overheat alarm signal if the battery cell module 250 is overheated, said signal then being transmitted to the contactless power transmitting apparatus 100.

The charging apparatus, which receives the first power or the second power transmitted by the contactless power transmitting apparatus 100 to charge the battery cell module 250 under the direction of the contactless power reception controlling unit 210, may include a power receiving coil 220, a rectifying unit 230, and a charging unit 240.

The power receiving coil 220 is coupled to the power transmitting coil 140 of the contactless power transmitting apparatus 100, using electromagnetic induction to receive the first power or the second power transmitted by the contactless power transmitting apparatus 100.

The rectifying unit 230 rectifies the first power or the second power, received by the power receiving coil 220, into a DC power.

The charging unit 240 charges the battery cell module 250 using the DC power rectified by the rectifying unit 230, under the direction of the contactless power reception controlling unit 210.

The second signal receiving unit 260 receives the ID request signal or the like transmitted by the contactless power transmitting apparatus 100 through the power receiving coil 220, and provides said signal to the contactless power reception controlling unit 210.

The first temperature sensor 270 detects a first temperature of the battery cell module 250 and provides the detected first temperature to the contactless power reception controlling unit 210.

The second temperature sensor 280 detects a second temperature of the environment and provides the detected second temperature to the contactless power reception controlling unit 210.

The second signal transmitting unit 290 generates one or more signals and transmits them to the contactless power transmitting apparatus 100 through the power receiving coil 220. These one or more signals may include but are not limited to the ID signal, the overheat alarm signal, the charge completion signal, and so forth.

Figure 2:
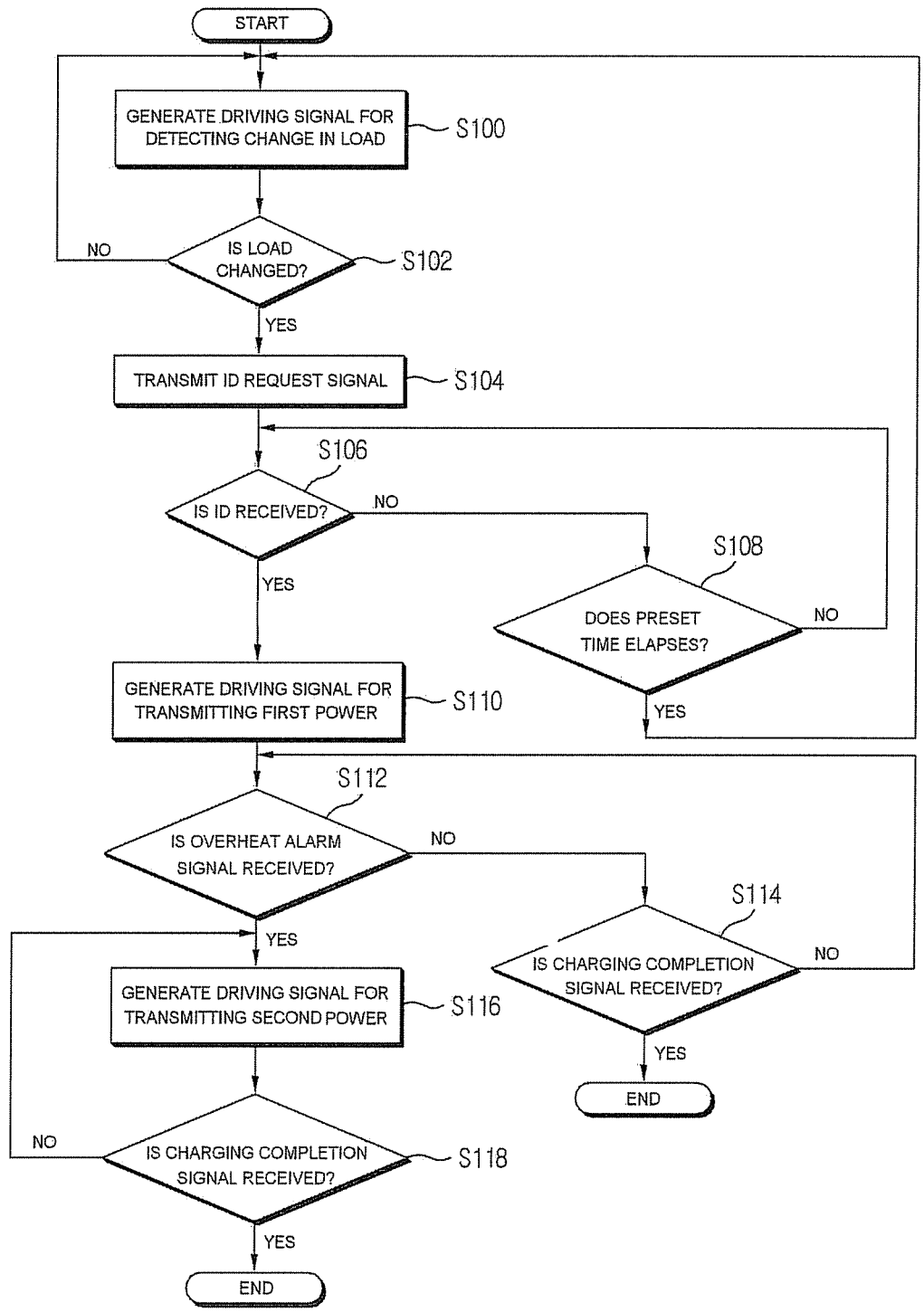
FIG. 2 is a signal flow chart showing operations of a contactless power transmission controlling unit in a method according to an embodiment of the present invention.

FIG. 2 is a signal flow chart showing operations of a contactless power transmission controlling unit 110 of a contactless power transmitting apparatus 100, according to an embodiment of the present invention.

In the embodiment depicted in FIG. 2, the contactless power transmitting apparatus 100 judges whether or not the contactless power receiving apparatus 200 may receive a power transmitted by the contactless power transmitting apparatus 100 and, if so, transmits the power to the contactless power receiving apparatus 200. In at least one embodiment, this judgment may be based on whether or not the power receiving coil 220 of the contactless power receiving apparatus 200 has approached the power transmitting coil 140 included in the contactless power transmitting apparatus 100.

To this end, the contactless power transmission controlling unit 110 of the contactless power transmitting apparatus 100 directs the driving driver 120 to generate a driving signal for detecting the change in the load (S100).

The driving signal is generated by the driving driver 120 and provided to the serial resonant converter 130.

The serial resonant converter 130 selectively switches a plurality of switching devices, according to the driving signal, to switch a DC power, thereby generating an AC power and outputting the generated AC power to the power transmitting coil 140, such that serial resonance is generated in the power transmitting coil 140.

Here, the first signal receiving unit 160 receives the signal of the power transmitting coil 140 and provides the received signal to the contactless power transmission controlling unit 110.

The contactless power transmission controlling unit 110 is provided with the signal of the first signal receiving unit 160 and judges whether or not a change in the load has been generated in the power transmitting coil 140 using the provided signal (S102).

That is, if the power receiving coil 220 of the contactless power receiving apparatus 200 does not approach the power transmitting coil 140, a change in impedance is not generated in the power transmitting coil 140.

In at least one embodiment, the first signal receiving unit 160 may receive a frequency signal according to the driving signal generated by the driving driver 120, and the contactless power transmission controlling unit 110 may judge, using said signal, that a change in the load has not been generated in the power transmitting coil 140.

In addition, when the power receiving coil 220 of the contactless power receiving apparatus 200 approaches the power transmitting coil 140 in order to charge the battery pack module 240 of the contactless power receiving apparatus 200, a change in impedance is generated in the power transmitting coil 140, and the frequency signal is changed according to the generated change in the impedance.

Therefore, the first signal receiving unit 160 receives the signal with a frequency changed according to the change in the impedance, and the contactless power transmission controlling unit 110 judges that a change in the load has been generated in the power transmitting coil 140 using the signal of the first signal receiving unit 160.

If it is judged in operation (S102) that a change in the load had not been generated, the contactless power transmission controlling unit 110 returns to operation (S100) to repeatedly direct the driving driver 120 to generate the driving signal for detecting a change in the load.

If it is judged in operation (S102) that a change in the load has been generated, the contactless power transmission controlling unit 110 directs the first signal transmitting unit 150 to generate an ID request signal, requesting the ID of the contactless power receiving apparatus 200, and transmits said signal to the contactless power receiving apparatus 200 through the power transmitting coil 140 (S104).

A change in the impedance may be generated in the power transmitting coil 140 not only when the power receiving coil 220 of the contactless power receiving apparatus 200 approaches the power transmitting coil 140 as described above, but even when foreign materials other than the contactless power receiving apparatus 200 approach the power transmitting coil 140. If the impedance is generated by foreign materials, then should the contactless power transmitting apparatus 100 transmit a power, a large amount of power would be unnecessarily consumed.

Therefore, while this operation may be excluded without departure from the scope of the present invention, in at least one embodiment, the contactless power transmission controlling unit 110 is provided with the signal of the first signal receiving unit 160 to judge whether or not the ID signal has been received from the contactless power receiving apparatus 200 (S106).

The contactless power transmission controlling unit 110 transmits the ID request signal to the contactless power receiving apparatus 200 if it is judged that the change in the load has been generated in the power transmitting coil 140, and judges whether the impedance of the power transmitting coil 140 has been changed by the contactless power receiving apparatus 200, based on whether the ID signal is received from the contactless power receiving apparatus 200 according to the ID request signal.

If it is judged in operation (S106) that the ID signal has not been received, the contactless power transmission controlling unit 110 judges whether or not a preset time has elapsed (S108), and returns to operation (S106) if it is judged that the preset time has not elapsed, thereby repeatedly judging whether or not the ID signal has been received from the contactless power receiving apparatus 200.

If the ID signal is not received from the contactless power receiving apparatus 200 and the preset time has elapsed, the contactless power transmission controlling unit 110 returns to operation (S100) to repeatedly instruct the driving driver 120 to generate the driving signal for detecting the change in the load.

On the other hand, if the ID signal is received before the preset time elapses, the contactless power transmission controlling unit 110 judges that the power receiving coil 220 of the contactless power receiving apparatus 200 has approached the power transmitting coil 140, and directs the driving driver 120 to generate the driving signal for transmitting the first power (S110).

The switching devices of the series resonant converter 130 are switched according to the driving signal for transmitting the first power, generated by the driving driver 120, to switch the DC power and apply the switched power to the power transmitting coil 140, such that the first power is transmitted from the power transmitting coil 140 to the power receiving coil 220 of the contactless power receiving apparatus 200.

Here, the contactless power transmission controlling unit 110 is provided with the signal of the first signal receiving unit 160 to judge whether or not an overheat alarm signal has been received from the contactless power receiving apparatus 200 (S112), and judges whether or not a charge completion signal has been received from the contactless power receiving apparatus 200 (S114) if it is judged that the overheat alarm signal has not been received.

If it is judged that the charge completion signal has been received from the contactless power receiving apparatus 200, the contactless power transmission controlling unit 110 ends the power transmission.

However, if the overheat alarm signal is received before the charge completion signal is received from the contactless power receiving apparatus 200, the contactless power transmission controlling unit 110 directs the driving driver 120 to generate a driving signal for transmitting a second power of lower wattage than the first power (S116).

In this case, the switching devices of the series resonant converter 130 are switched according to the driving signal for transmitting the second power, generated by the driving driver 120, such that the second power is transmitted from the power transmitting coil 140 to the power receiving coil 220.

Here, the contactless power transmission controlling unit 110 is provided with the signal of the first signal receiving unit 160 to judge whether or not the charge completion signal has been received from the contactless power receiving apparatus 200 (S118).

If it is judged that the charge completion signal has not been received, the contactless power transmission controlling unit 110 returns to operation (S116) to repeatedly instruct the driving driver 120 to generate the driving signal for the second power, and to judge whether or not the charge completion signal has been received from the contactless power receiving apparatus 200, ending the power transmission if the charge completion signal is received.

Figure 3:
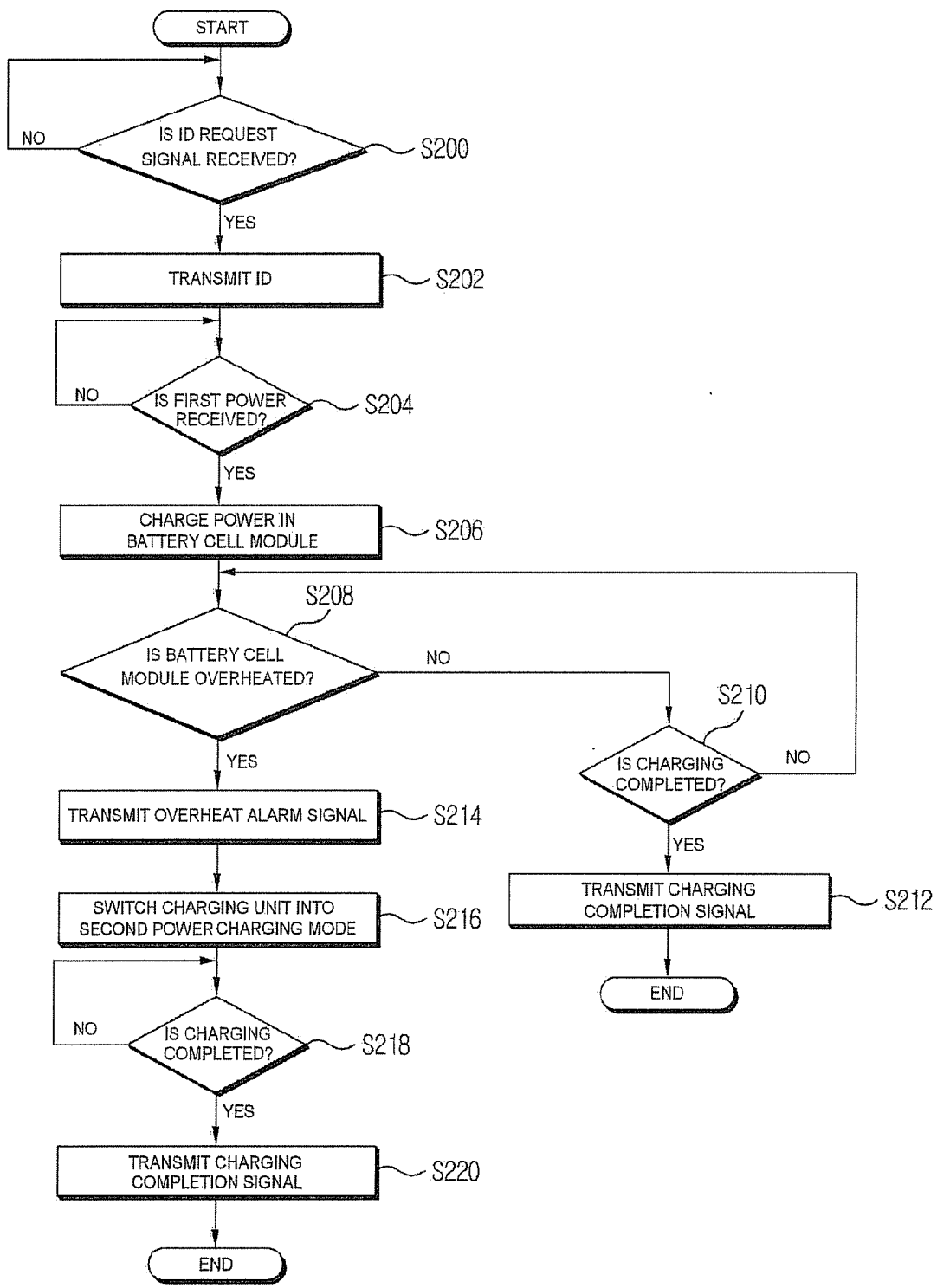
FIG. 3 is a signal flow chart showing operations of a contactless power reception controlling unit in a method according to an embodiment of the present invention.

FIG. 3 is a signal flow chart showing operations of a contactless power reception controlling unit 210 in a method, according to an embodiment of the present invention.

In the embodiment depicted in FIG. 3, the contactless power reception controlling unit 210 judges whether or not the ID request signal has been received from the contactless power transmitting apparatus 100 (S200).

That is, the ID request signal, which the contactless power transmission controlling unit 110 of the contactless power transmitting apparatus 100 directs the first signal transmitting unit 150 to transmit in operation (S104), is induced from the power transmitting coil 140 to the power receiving coil 220. The second signal receiving unit 260 then receives the induced ID request signal and provides said signal to the contactless power reception controlling unit 210, and the contactless power reception controlling unit 210 judges whether or not the ID request signal has been received.

When the ID request signal is received from the contactless power transmitting apparatus 100, the contactless power reception controlling unit 210 directs the second signal transmitting unit 290 to generate an ID signal and transmit said signal to the contactless power transmitting apparatus 100 through the power receiving coil 220 (S202).

The ID signal transmitted by the contactless power receiving apparatus 200 is induced from the power receiving coil 220 to the power transmitting coil 140 as described above, the first signal receiving unit 160 receives the ID signal and provides said signal to the contactless power transmission controlling unit 110, and the contactless power transmission controlling unit 110 judges whether or not the ID signal has been received in operation (S106).

Here, the first power transmitted by the contactless power transmitting apparatus 100 is induced to the power receiving coil 220, the rectifying unit 230 rectifies the induced first power and provides the rectified first power to the charging unit 240, and the contactless power reception controlling unit 210 monitors the charging unit 240 to judge whether or not the first power has been received (S204).

If it is judged that the first power has been received, the contactless power reception controlling unit 210 directs the charging unit 240 to charge the battery cell module 250 with the received first power (S206).

While the first power charges the battery cell module 250 as described above, the contactless power reception controlling unit 210 judges whether or not the battery cell module 250 has been overheated (S208).

Here, whether or not the battery cell module 250 has been overheated may be judged by several methods according to various embodiments.

For example, the contactless power reception controlling unit 210 may detect a first temperature of the battery cell module 250 using the first temperature sensor 270 and judge that the battery cell module 250 has been overheated if the detected first temperature of the battery cell module 250 is equal to or higher than a preset temperature. In this case, the second temperature sensor 280 may not be necessary or provided.

Alternatively to or in combination with the above method, the contactless power reception controlling unit 210 may detect both said first temperature of the battery cell module 250, using the first temperature sensor 270, and a second temperature of the environment, using a second temperature sensor 280, and judge that the battery cell module 250 has been overheated if the difference between the detected first and second temperatures is equal to or higher than a preset temperature difference; for example, if the first temperature is higher than the second temperature by 10° C. or more.

It will be recognized by those skilled in the art that still other methods of detecting a state of overheating are possible without departing from the scope of the present invention.

If it is judged that the battery cell module 250 has not been overheated, the contactless power reception controlling unit 210 monitors the charging unit 240 to judge whether or not the charging of the battery cell module 250 has been completed (S210).

Here, when it is judged that the charging of the battery cell module 250 has been completed without overheating, the contactless power reception controlling unit 210 directs the second signal transmitting unit 290 to generate the charge completion signal and transmit said signal to the contactless power transmitting apparatus 100 through the power receiving coil 220 (S212).

The transmitted charge completion signal is induced to the power transmitting coil 140 of the contactless power transmitting apparatus 100 and is received by the first signal receiving unit 160 as described above, and the contactless power transmission controlling unit 110 judges whether or not the charge completion signal has been received in operation (S118).

However, if it is judged that the battery cell module 250 has been overheated before the charging of the battery cell module 250 is completed, the contactless power reception controlling unit 210 directs the second signal transmitting unit 290 to generate an overheat alarm signal and to transmit said signal to the contactless power transmitting apparatus 100 through the power receiving coil 220 (S214).

The transmitted overheat alarm signal is induced to the power transmitting coil 140 and is received by the first signal receiving unit 160. The contactless power transmission controlling unit 110 judges whether or not the overheat alarm signal has been received in operation (S112) and directs the driving driver 120 to generate the driving signal for transmitting a second power, of lower wattage than the first power, if it is judged that the overheat alarm signal has been received, thereby allowing the second power to be transmitted, as described above.

Here, the contactless power reception controlling unit 210 directs the charging unit 240 to be switched into a second power charging mode, thereby allowing the second power to charge the battery cell module 250 (S216).

If the second power is provided to the charging unit 240 from the rectifying unit 230, but the charging unit 240 remains in the first power charging mode, the charging unit 240 may judge that an error has been generated. Therefore, while this function may be excluded without departure from the scope of the present invention, in at least one embodiment, the contactless power reception controlling unit 210 both generates the overheat alarm signal and switches the charging unit 240 into the second power charging mode, thereby preventing the generation of an error by the charging unit.

While it is judged that the second power is charging the battery cell module 250 as described above, the contactless power reception controlling unit 210 monitors the charging unit 240 to judge whether or not the charging of the battery cell module 250 has been completed (S218).

If it is judged that the charging has not been completed, the contactless power reception controlling unit 210 continues said monitoring of the charging unit 240.

If it is judged that the charging of the battery cell module 250 has been completed, the contactless power reception controlling unit 210 directs the second signal transmitting unit 290 to generate the charge completion signal and transmit said signal to the contactless power transmitting apparatus 100 through the power receiving coil 220 (S220), and then ends the charging operation.

In summary, according to an embodiment of the present invention, while the contactless power transmitting apparatus transmits the first power to the contactless power receiving apparatus to charge the battery cell module, whether or not the battery cell module has been overheated is judged, and the contactless power transmitting apparatus transmits the second power, of lower wattage than the first power, to the contactless power receiving apparatus to charge the battery cell module if it is judged that the battery cell module has been overheated. Therefore, it is possible to prevent the battery cell module from being overheated and damaged, and to fully charge the battery cell module without risk of damage due to overheating.

Although a few embodiments of the present invention have been shown and described, it would be appreciated by those skilled in the art that changes may be made in these embodiments without departing from the principles and spirit of the invention, the scope of which is defined in the claims and their equivalents. Accordingly, the scope of the present invention is not construed as being limited to the described embodiments.

What is claimed is:

1. A wireless power transmitting method of a wireless power transmitting apparatus in a system to wirelessly charge a power, the method comprising:
    detecting approach of a wireless power receiving apparatus based on a change in impedance of a power transmitting coil, and verifying the wireless power receiving apparatus;
    wirelessly transmitting a first power to the wireless power receiving apparatus; and
    wirelessly transmitting a second power having a lower power level than the first power to the wireless power receiving apparatus when an overheat alarm signal is received from the wireless power receiving apparatus during a process of transmitting the first power to the wireless power receiving apparatus.

2. The method of claim 1, wherein the first power and the second power are transferred to a power receiving coil of the wireless power receiving apparatus through a power transmitting unit expressed as a circuit in which a coil and a capacitor are connected in series.

3. The method of claim 1, wherein the verifying comprises receiving an identification signal of the wireless power receiving apparatus.

4. The method of claim 1, wherein the verifying comprises:
    generating a driving signal for detecting the change in the impedance of the power transmitting coil; and
    determining whether an identifier signal of the wireless power receiving apparatus is received within a predetermined period of time when the change in the impedance of the power transmitting coil is detected,
    wherein the generating of the driving signal and the determining is repeatedly performed when the identifier signal is not received after the predetermined period of time is elapsed.

5. A wireless power receiving method of a wireless power receiving apparatus in a system to wirelessly charge a power, the method comprising:
    generating a change in impedance of a power transmitting coil and transmitting a message to a wireless power transmitting apparatus;
    wirelessly receiving a first power from the wireless power transmitting apparatus;
    determining whether the wireless power receiving apparatus is overheated during a process of receiving the first power, and transmitting an overheat alarm signal to the wireless power transmitting apparatus when overheat of the wireless power receiving apparatus is detected; and
    receiving a second power having a lower power level than the first power from the wireless power transmitting apparatus.

6. The method of claim 5, wherein the first power and the second power are received from a power transmitting unit of the wireless power transmitting apparatus expressed as a circuit in which a coil and a capacitor are connected in series.

7. The method of claim 5, wherein the message comprises identifier information of the wireless power receiving apparatus.

8. The method of claim 5, wherein the transmitting a message to the wireless power transmitting apparatus comprises:
   receiving an identification request signal from the wireless power transmitting apparatus when the change in the impedance of the power transmitting coil is detected by the wireless power transmitting apparatus; and
   transmitting identification signal of the wireless power receiving apparatus to the wireless power transmitting apparatus.

9. The method of claim 1, wherein the wireless power transmitting apparatus generate a signal periodically for detecting approach of the wireless power receiving apparatus.

* * * * *